United States Patent
Kikuchi et al.

(10) Patent No.: US 6,681,268 B1
(45) Date of Patent: Jan. 20, 2004

(54) DUAL POINTING SCREEN CURSOR DEVICE COMPRISING TOUCH PAD AND STICK WHEREIN EACH HAS IDENTIFYING BYTES THAT IS TRANSMITTED THROUGH SINGLE CHANNEL PORT

(75) Inventors: Yoshiyuki Kikuchi, Fukushima-ken (JP); Shoji Suzuki, Fukushima-ken (JP); Kouichi Miura, Fukushima-ken (JP); Akihisa Itoh, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/471,837

(22) Filed: Dec. 23, 1999

(30) Foreign Application Priority Data

Dec. 28, 1998 (JP) ............................................. 10-373314

(51) Int. Cl.⁷ ........................ G06F 13/00; G06F 15/00; G06F 3/00; G09G 5/00
(52) U.S. Cl. .......................... 710/16; 710/12; 710/15; 710/38; 710/72; 710/73; 345/73; 345/146; 345/156; 345/163; 345/168; 345/173; 345/768
(58) Field of Search .................. 710/12, 16, 38, 710/72, 73, 15; 345/168, 173, 146, 768, 156, 73, 163

(56) References Cited

U.S. PATENT DOCUMENTS

| | | | | |
|---|---|---|---|---|
| 5,790,889 A | * | 8/1998 | Witte | 710/8 |
| 5,798,752 A | * | 8/1998 | Buxton et al. | 345/146 |
| 5,831,597 A | * | 11/1998 | West et al. | 345/163 |
| 5,856,822 A | * | 1/1999 | Du et al. | 345/73 |
| 5,859,629 A | * | 1/1999 | Tognazzini | 345/173 |
| 5,982,358 A | * | 11/1999 | Fleming, III | 345/168 |
| 5,990,872 A | * | 11/1999 | Jorgenson et al. | 345/168 |
| 6,011,541 A | * | 1/2000 | Klein | 345/156 |
| 6,043,809 A | * | 3/2000 | Holehan | 345/168 |
| 6,065,069 A | * | 5/2000 | Klein | 710/15 |
| 6,075,517 A | * | 6/2000 | Frid | 345/156 |
| 6,333,753 B1 | * | 12/2001 | Hinckley | 345/768 |
| 6,392,634 B1 | * | 5/2002 | Bowers et al. | 345/163 |
| 6,404,621 B2 | * | 6/2002 | Zamora et al. | 361/680 |
| 6,532,003 B2 | * | 3/2003 | Nagao | 345/168 |

FOREIGN PATENT DOCUMENTS

| | | |
|---|---|---|
| EP | 0 584 464 A1 | 3/1994 |
| EP | 0 789 294 A2 | 8/1997 |
| JP | 8-286827 | 11/1996 |
| WO | WO 98/43202 | 10/1998 |

OTHER PUBLICATIONS

AN 1995–396560, —XP–002133992—Database WPI, Derwent Publications Ltd., London, GB, Week 9551.
AN 1999–116087—XP–002133993—Database WPI, Derwent Publications Ltd., London, GB, Week 9910.
AN 1998–338076—XP–002133996—Database WPI, Derwent Publications Ltd., London, GB, Week 9830.

* cited by examiner

Primary Examiner—Jeffrey Gaffin
Assistant Examiner—Tammara Peyton
(74) Attorney, Agent, or Firm—Brinks Hofer Gilson & Lione

(57) ABSTRACT

A personal computer system enables simultaneous use of a relative-coordinate-mode input device and an absolute-coordinate-mode input device, thereby allowing correct input of absolute coordinate data, such as for characters. A pad-type first input device and a stick-type second input device are provided for a notebook computer. The first input device outputs both absolute coordinate data and relative coordinate data. The second input device outputs only relative coordinate data. When the absolute coordinate data is output, the relative coordinate data format is converted into the same format as the absolute coordinate data, and ID information for distinguishing the relative coordinate data from the absolute coordinate data is added to part of the relative coordinate data format.

2 Claims, 4 Drawing Sheets

FIG. 4

| BYTE | BIT 7 | 6 | 5 | 4 | 3 | 2 | 1 | 0 |
|---|---|---|---|---|---|---|---|---|
| 1 | YO | XO | YS | XS | 1 | \multicolumn{3}{c}{BUTTON INFORMATION} |
| 2 | 0 | \multicolumn{7}{c}{X COUNT} |
| 3 | 0 | \multicolumn{7}{c}{Y COUNT} |

FIG. 5

| BYTE | BIT 7 | 6 | 5 | 4 | 3 | 2 | 1 | 0 |
|---|---|---|---|---|---|---|---|---|
| 1 | 1 | 1 | 1 | 1 | 1 | 1 | 1 | 1 |
| 2 | 0 | X COUNT | | | | | | |
| 3 | 0 | X COUNT | | | | BUTTON INFORMATION | | |
| 4 | 0 | Y COUNT | | | | BUTTON INFORMATION | | |
| 5 | 0 | Y COUNT | | | | | | |
| 6 | 0 | Z COUNT | | | | | | |

30

DUAL POINTING SCREEN CURSOR DEVICE COMPRISING TOUCH PAD AND STICK WHEREIN EACH HAS IDENTIFYING BYTES THAT IS TRANSMITTED THROUGH SINGLE CHANNEL PORT

BACKGROUND OF THE INVENTION

1. Field of the Invention

The present invention relates to a personal computer system that allows information input from different types of input devices, such as a pad-type input device and a pointing-stick-type (hereinafter simply referred to as the "stick-type") input device, both of which are integrated into a notebook computer, to be processed by using software.

2. Description of the Related Art

As conventional input devices (controllers) for use in notebook computers, pad-type input devices and stick-type input devices are used.

In a pad-type input device, a quadrilateral flat pad is disposed in the vicinity of a keyboard, and a user slides a finger on the pad so as to input information to move a pointer (mouse cursor) displayed on the screen in the X- and Y-axis directions (i.e., in the plane of the screen). By tapping a finger on the pad, Z-axis information can also be input.

In a stick-type input device, a small-diameter stick is disposed in the vicinity of the center of a keyboard, and a user tilts the stick with a finger in a desired direction so as to input information for moving a pointer displayed on the screen in the X- and Y-axis directions.

By using the pad-type input device, both relative coordinate data and absolute coordinate data can be output to a computer. By using the stick-type input device, only relative coordinate data is output to a computer. The relative-coordinate-data input mode is used for moving a cursor on the computer screen, while the absolute-coordinate-data input mode is used for moving the cursor or manually writing characters, graphics, etc.

Generally, as shown in FIG. 4, the relative coordinate data handled for each type of input device is processed by a three-byte format signal. The first-byte field indicates the overflow bit (YO, XO), the sign bit (YS, XS), button information, etc. The second- and third-byte fields represent X-coordinate and Y-coordinate variable information formed of the X count and the Y count, respectively.

The absolute coordinate data is processed, as illustrated in FIG. 5, by a six-byte format signal. The first-byte field designates ID information for distinguishing the corresponding input device from an external input device (for example, a mouse). The second-, third-, fourth-, fifth-, and sixth-byte fields respectively indicate the X count, the X count and button information, the Y count and button information, the Y count, and the Z count.

However, in the above-described conventional personal computer system, the two types of input devices, such as the pad-type input device and the stick-type input device, cannot be easily used in combination, which causes the following problems.

To input absolute coordinate data by using the pad-type input device (for example, to write characters, such as signatures), a user slides a finger or a pen on the pad. In this case, once the user lifts the finger or the pen away from the pad at the intersection of lines forming a character, the user may not be able to recognize the position from which the user should begin writing the next stroke. This may disturb the balance of the character or make the character illegible, and the user may thus be required to input the character again.

As stated above, conventional pad-type input devices have been employed for inputting characters. However, the resulting operation-data format signals differ between relative coordinate data and absolute coordinate data. Accordingly, a switching operation between the relative-coordinate-data input mode and the absolute-coordinate-data input mode is required. For example, when the user loses track of the input position while operating in the absolute-coordinate-data input mode, the user switches to the relative-coordinate-data input mode. In this case, specific software is required for switching between the relative coordinate data and the absolute coordinate data, and in some cases, the computer must be restarted, thereby reducing ease of operation.

SUMMARY OF THE INVENTION

Accordingly, in order to solve the above-described problems, it is an object of the present invention to provide a personal computer system that allows relative coordinate data and absolute coordinate data to be used simultaneously without the need for a switching operation.

It is another object of the present invention to provide a personal computer system that allows a relative-coordinate-data input device and an absolute-coordinate-data input device to have the same type of signal format so as to simplify signal processing in response to an input from an input device and also to easily distinguish between the two types of input devices.

In order to achieve the above-described objects, according to one aspect of the present invention, there is provided a personal computer system including a plurality of different types of coordinate input devices, a keyboard input device, an output device for outputting a signal from each of the coordinate input devices, and a processing unit for performing processing based on signals from the output device in accordance with an operation of each of the coordinate input devices. A single output port of the output device is shared by the coordinate input devices.

According to another aspect of the present invention, there is provided a personal computer system including a first input device, a second input device, the second input device performing a detecting operation in a manner differing from the first input device, a keyboard input device, and an output device for converting one of an output signal from the first input device and an output signal from the second input device, or for converting both the output signals from the first input device and from the second input device and outputting the resulting signals in an identical format. Thus, the first input device and the second input device are alternately or simultaneously used.

In the aforementioned personal computer system, the first input device may output absolute coordinate data and/or relative coordinate data, and the second input device may output relative coordinate data.

The first input device may be a pad-type input device disposed closer to an operator than the keyboard input device, and the second input device may be a stick-type input device disposed between keys of the keyboard input device.

According to a further aspect of the present invention, there is provided a personal computer system including a first input device, a second input device, an output device for outputting operation signals from the first input device and from the second input device in an identical signal format, and a processing unit for performing processing based on the signal supplied from the output device in accordance with an operation of each of the first input device and the second input device. The output device adds identification (ID) information to part of the signal format according to the type of input device.

According to the present invention, a plurality of different types of coordinate input devices are provided, and the single output port of the output device is shared by the plurality of input devices. Thus, the structure of the output port is simple, and output signals from the output port can be in the same format. As a consequence, only a single processing unit is required for the plurality of coordinate input devices.

In the present invention, the first input device and the second input device employing different detecting operation modes, and the keyboard input device are provided for the personal computer system. The different types of input devices can be simultaneously used without the need for a switching operation. Accordingly, the first and second input devices are suitably used in combination according to the purpose of use and operability of the individual devices, thereby improving ease of operation.

The first input device outputs absolute coordinate data and/or relative coordinate data, thereby enabling signatures, characters, etc. to be input. The first input device also outputs X- and Y-axis relative coordinate data. The second input device only outputs X- and Y-axis relative coordinate data. Thus, the type of data to be input can be selected according to the operating use.

Additionally, as discussed above, the first input device, which serves as a pad-type input device, is disposed closer to an operator than the keyboard input device, while the second input device, which serves as a stick-type input device, is disposed between keys of the keyboard input device, thereby further enhancing the operating use.

By using different types of input devices integrated into, for example, a notebook computer, the user is able to simultaneously perform operations without having to switch between the input devices. In this case, when the two different types of input devices are used simultaneously, the processing in the processing unit having a built-in device driver becomes complicated unless the signals having the same format are output from the output device. It is also difficult to distinguish between the output signals supplied from the different input devices. Accordingly, in the present invention, ID information is added to part of the signal format output from one of the input devices so as to distinguish between the signals output from the two input devices.

In the present invention, the first input device may output variable information on X, Y, and Z three-dimensional coordinates, and the second input device may output variable information on X and Y two-dimensional coordinates. In using the second input device, fixed information may be added to a Z-information field of the signal format output from the output device. In this case, the processing unit may process the X, Y, and Z information as absolute coordinate data and X and Y information as relative coordinate data.

For example, the output device may generate six-byte absolute coordinate data and may supply it to the processing unit in response to the variable information on the X, Y, and Z three-dimensional coordinates supplied from the first input device. The output device may convert three-byte displacement data into six-byte data in response to the variable information on the X and Y two-dimensional coordinates supplied from the second input device, and fixed information may be added to a Z-information field of the converted six-byte data.

More specifically, the individual byte fields of the six-byte data supplied from the output device to the processing unit may respectively indicate the identification information, X count information, X count and button information, Y count and button information, Y count information, and Z count information. The Z-count information may become variable in accordance with an operation of the first input device in response to the variable information supplied from the first input device, and the Z-count information may become fixed in response to the variable information supplied from the second input device.

With this arrangement, the three-byte format of the relative coordinate data is converted into the six-byte format in the output device, which appears to be the same format as the absolute coordinate format, and is then sent to the processing unit. In this case, there is no need to fill coordinate data in the Z-axis data field of the relative coordinate data format. Thus, ID information for distinguishing the relative coordinate data from the absolute coordinate data is filled in the Z-axis data field. If the Z-axis data field is used normally from 00h through 7Fh, 00h through 7Eh are assigned to the variable information of the absolute coordinate data, and the remaining 7Fh is allocated to the ID information of the relative coordinate data. Thus, when the 7Fh data is output from the output device and is sent to the device driver of the processing unit, it can be determined that the coordinate data has been supplied from the input device that outputs only X- and Y-axis variable information.

The absolute coordinate data and the relative coordinate data can be output by using, for example, a pad-type input device, and the relative coordinate data can be output by using, for example, a stick-type input device. In the pad-type input device, signatures, characters, and so on, can be input by using a finger or a pen on the pad surface, i.e., the absolute coordinate data can be output according to the path of dot data. The X- and Y-axis relative coordinate data (displacement data) can also be output by sliding a finger on the pad surface. In the stick-type input device, the stick-type operator is tilted in a desired direction so as to output X- and Y-axis relative coordinate data.

By outputting the relative coordinate data, the pointer (cursor) displayed on the display unit can be moved in a desired direction. In contrast, in the absolute-coordinate-input mode, a desired region displayed on the display unit can be selected. By outputting the absolute coordinate data, signature authentication, such as for character input, can be performed.

Moreover, both types of input devices can be used simultaneously, and when they are in the relative-coordinate-input mode, the user is able to use both the input devices without the need for a switching operation. Even when both the relative-coordinate-data mode and the absolute-coordinate-data mode are employed, the user is able to use both the input devices without the need for a switching operation. In this case, when both types of input devices are used simultaneously in the two modes, output coordinate data are alternately sent to the driver provided for the processing unit, and predetermined processing is performed on the data.

In conducting character input by sliding a finger or a pen on the pad surface by using a pad-type input device, once the user lifts the finger or the pen from the pad surface, the user may not be able to recognize the input position. In this case, the user operates the stick-type input device to move the pointer to the position at which the user stopped writing, and then continues writing the characters. As a consequence, the characters can be input correctly.

The output device may include a switching portion for switching between a path for converting the variable information obtained from the second input device into the six-byte data and a path for outputting the variable information as three-byte data.

With this configuration, when relative coordinate data is output form both the first and second input devices, the data from the second input device is processed by the three-byte format and is sent to the processing unit.

In the aforementioned personal computer system of the present invention, not only a combination of two input devices, such as a pad-type input device and a stick-type input device, but also a mouse-type input device may be connected as an external device. All the data from the three input devices are processed by a driver provided for the processing unit. In this case, characters may be input into the pad-type input device to output absolute coordinate data. Scroll data may be input into the stick-type input device to vertically and horizontally scroll an editing screen of a word processor or a spreadsheet. Relative coordinate data may be output from the mouse-type input device to move the pointer (cursor) on the screen.

The position and content of the ID information may be changed.

BRIEF DESCRIPTION OF THE DRAWINGS

FIG. 4 schematically illustrates the data arrangement processed by a three-byte format; and FIG. 5 schematically illustrates the data arrangement processed by a six-byte format.

DESCRIPTION OF THE PREFERRED EMBODIMENTS

An embodiment of the present invention is described below with reference to the drawings.

Figure 1:
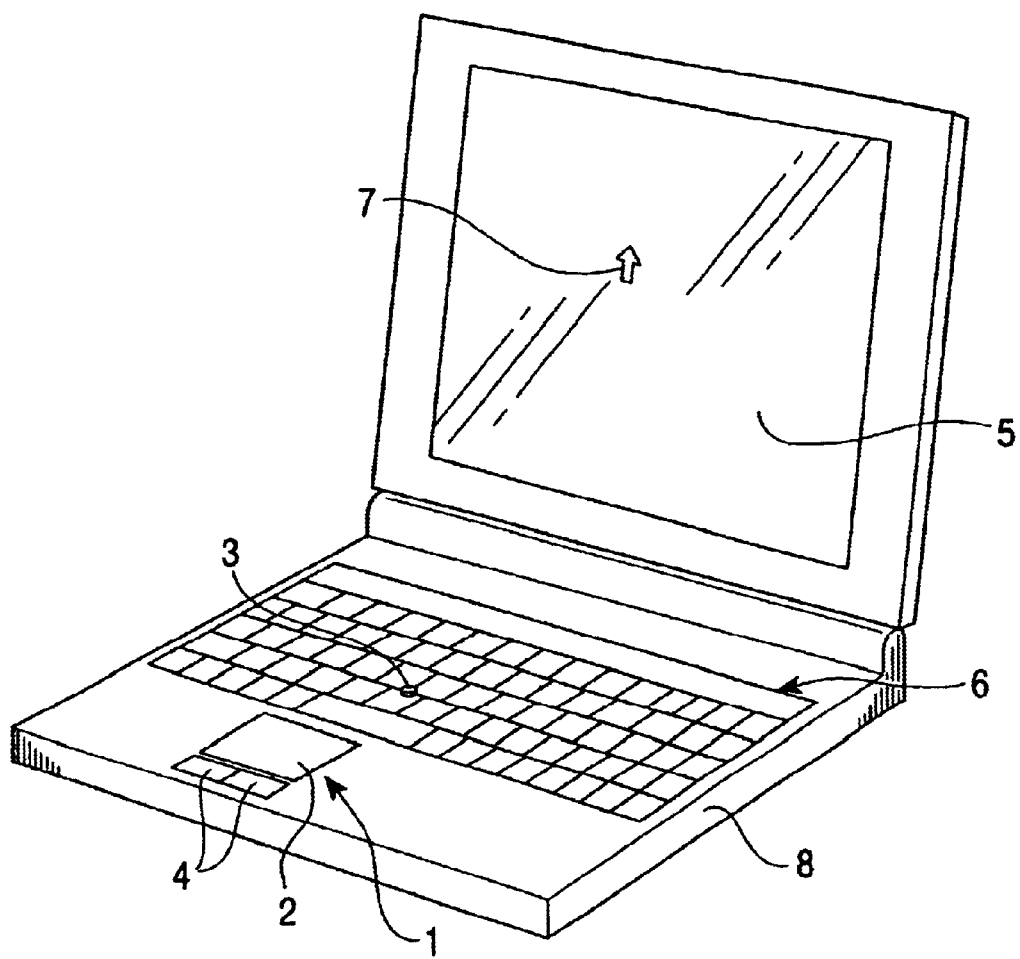
FIG. 1 is a perspective view illustrating the external appearance of a notebook computer incorporating a personal computer system according to an embodiment of the present invention.

Referring to the perspective view of a notebook computer shown in FIG. 1, a personal computer system generally indicated by 1 is integrated into the notebook computer. More specifically, a keyboard 6 is disposed on the upper surface of a housing 8. A first input device 2 using a quadrilateral flat pad-type sensor 2a (FIG. 2) is disposed at the proximal side adjacent to the keyboard 6. A second input device 3 using a stick-type distortion sensor 3a (FIG. 2) is provided in the vicinity of the center of the keyboard 6. Button switches 4 and 4 are horizontally disposed separately from the first input device 2 at the proximal side.

Only relative coordinate data is input by using the second input device 3, while both relative coordinate data and absolute coordinate data are input by using the first input device 2. The first input device 2 may be of an electrostatic capacitive type or a pressure-sensing type.

A display unit 5, which is formed of a pivotable liquid crystal panel, is attached to the housing 8. When the first input device 2 is used, the relative coordinate data for shifting a pointer (cursor) 7 indicated on the display unit 5 can be input by sliding a finger or a pen on the pad surface. When the second input device 3 is used, the above relative coordinate data can be input by pressing the head of the stick with a finger in a desired direction. Additionally, by using the first input device 2, signatures, characters, graphics, etc., can be written on the pad surface, so that the path of the signatures, characters, graphics, etc., are input as absolute coordinate data and are displayed on the display unit 5.

Figure 2:
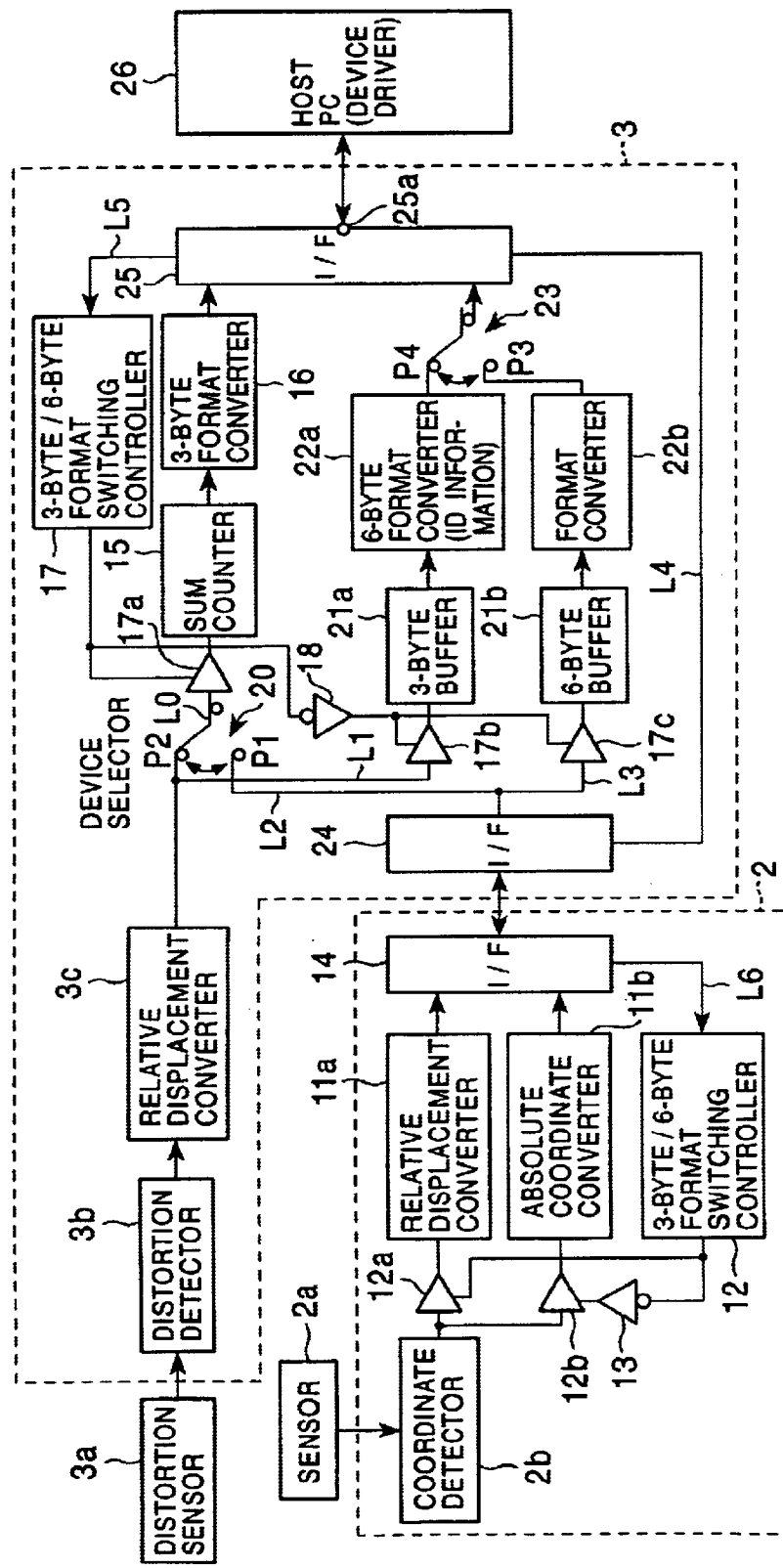
FIG. 2 is a block diagram illustrating the circuit configuration of an embodiment of the present invention.

Referring to the block diagram shown in FIG. 2, the personal computer system 1 is formed of the first input device 2, the second input device 3, and a host personal computer (host PC) 26. The distortion sensor 3a, which serves as a stick-type input device, the sensor 2a, which serves as a pad-type input device, and the related elements other than hardware may be formed by an electronic circuit built into the housing 8. Alternatively, the above-described elements, other than the input devices, may be integrated into the host PC 26 as software. The input devices and the related elements other than hardware correspond to an output device of the present invention, a device driver built into the host PC 26 corresponds to a processing unit of the present invention.

The first input device 2 and the second input device 3 are connected to each other via interfaces 14 and 24. The host PC 26 is connected to the second input device 3 via an interface 25. With this arrangement, output data of the first input device 2 and output data of the second input device 3 are output from a single output port 25a of the interface 25, and there is no need to provide processing units separately for the first input device 2 and the second input device 3. In other words, the device driver of the host PC 26 serves as a shared processing unit for processing signals from both the first input device 2 and the second input device 3. The signals processed by the device driver undergo further predetermined processing by an operating system (OS) so as to be converted into signals to be output to the display unit 5.

The first input device 2 is provided with the sensor 2a, which serves as a pad-type input device, for detecting the contact of a finger or a pen with the pad surface, and a coordinate detector 2b for detecting the contact position of the finger or the pen.

The first input device 2 is also provided with a relative displacement (coordinate) converter 11a for converting operation data into relative coordinate data, and with an absolute coordinate converter 11b for converting operation data into absolute coordinate data, both converters 11a and 11b being connected in parallel to the coordinate detector 2b. The relative displacement converter 11a and the absolute coordinate converter 11b are connected to the interface 14. A three-byte/six-byte format switching controller 12 is also connected to the interface 14 so as to control via an inverter 13 a switch 12a disposed between the relative displacement converter 11a and the coordinate detector 2b and a switch 12b provided between the absolute coordinate converter 11b and the coordinate detector 2b.

In response to a command from the host PC 26, the format switching controller 12 switches between the input operation for inputting three-byte relative coordinate data shown in FIG. 4 by using the sensor 2a and the input operation for inputting six-byte absolute coordinate data shown in FIG. 5 by using the sensor 2a. When relative coordinate data is input from the coordinate detector 2b, the switch 12a is turned on and the switch 12b is turned off. Conversely, when the absolute coordinate data is input from the coordinate detector 2b, the switch 12b is turned on and the switch 12a is turned off.

The second input device 3 includes the distortion sensor 3a, which serves as a stick-type input device, for detecting distortion of the stick, and a distortion detector 3b for detecting the amount of distortion. A value obtained from the distortion detector 3b is converted into relative displacement data by a relative displacement (coordinate) converter 3c.

The relative displacement converter 3c is connected to a sum counter 15 and a three-byte format converter 16. Relative displacement data sequentially input from the relative displacement converter 3c is accumulated in the sum counter 15, and is converted into the three-byte relative coordinate data format shown in FIG. 4 by the format converter 16. The data is then sent to the device driver of the host PC 26 via the interface 25, and predetermined processing is executed on the data.

The relative displacement converter 3c is also connected to a three-byte buffer 21a and to a six-byte format converter 22a. The relative displacement data supplied from the relative displacement converter 3c is temporarily stored in the buffer 21a. The relative displacement data is then converted into the six-byte relative coordinate data shown in FIG. 5 by the format converter 22a, and an ID flag, which serves as ID information, is added to part of the six-byte format. When the circuit of a device selector 23 is closed, the six-byte relative coordinate data is sent to the host PC 26 from the format converter 22a via the interface 25.

The relative displacement data supplied from the relative displacement converter 11a of the first input device 2 is sent to the interface 24 via the interface 14 and passes through a device selector 20 and the sum counter 15 via a line L2. As a result, the relative displacement data is sent to the three-byte format converter 16.

Meanwhile, the absolute coordinate data sent to the interface 24 from the absolute coordinate converter 11b of the first input device 2 is temporarily stored in the six-byte buffer 21b and is converted into the six-byte format illustrated in FIG. 5 by a format converter 22b. When the device selector 23 is actuated, the six-byte-format absolute coordinate data is sent to the host PC 26 from the buffer 21b via the interface 25.

Switches 17a, 17b, and 17c are respectively provided for a line L0 for connecting the relative displacement converter 3c of the second input device 3 and the sum counter 15, a line L1 for connecting the relative displacement converter 3c and the three-byte buffer 21a, and a line L3 for connecting the first input device 2 and the six-byte buffer 21b via the interface 24. The switch 17a is controlled by a three-byte/six-byte format switching controller 17, while the switches 17b and 17c are controlled by the format switching converter 17 via an inverter 18.

According to the personal computer system 1 configured as described above, relative coordinate data both from the pad-type sensor 2a and from the stick-type distortion sensor 3a can be sent to the host PC 26 as the three-byte-format relative coordinate data illustrated in FIG. 4. Moreover, both absolute coordinate data from the pad-type sensor 2a and relative coordinate data from the stick-type sensor 3a can be supplied to the host PC 26 as the six-byte format signal shown in FIG. 5.

It may be determined by using dedicated software whether the data is to be converted into the three-byte format or the six-byte format or whether the data input from the pad-type sensor 2a is to be handled as relative coordinate data or absolute coordinate data. Alternatively, the keyboard 6 may be used to directly input the selection.

When both the data input from the pad-type sensor 2a and the data input from the stick-type distortion sensor 3a are used as three-byte-format relative coordinate data, the format switching controller 17 changes the switches 17a, 17b, and 17c so that the first input device 2 and the second input device 3 execute only three-byte format processing. That is, the format switching controller 17 controls the switch 17a to be turned on and the switches 17b and 17c to be turned off via the inverter 18.

In this case, a switching signal is transmitted to the format switching controller 12 from the host PC 26 via the interface 25, the line L4, the interface 24, the interface 14, and a line L6, thereby turning on the switch 12a and the turning off the switch 12b. Accordingly, data (relative coordinate data) obtained by the operation of the sensor 2a of the first input device 2 is supplied to the relative displacement converter 11a and is converted into the relative coordinate data. The relative coordinate data is then sent to the interface 24 of the second input device 3 via the interface 14.

The device selector 20 selects between the relative displacement data converted from the amount of displacement by the relative displacement converter 3c after being detected by the distortion sensor 3a, and the relative displacement data sent from the relative displacement converter 11a via the line L2. More specifically, when the device selector 20 is switched to P1, the relative displacement data from the pad-type sensor 2a is supplied to the sum counter 15. When the device selector 20 is switched to P2, the relative displacement coordinate data from the stick-type distortion sensor 3a is supplied to the sum counter 15. The device selector 20 is switched to either the P1 or the P2 side under the control of the host PC 26 according to whether the sensor 2a or 3a is operated. Alternatively, the selector 20 may be alternately and rapidly switched to the P1 and P2 sides, and the relative displacement data may be supplied to the sum counter 15 every time the pad-type sensor 2a or the stick-type distortion sensor 3a is used.

The displacement values added in the sum counter 15 are converted into the three-byte format shown in FIG. 4 by the three-byte format converter 16, and the resulting signal is sent to the host PC 26 via the interface 25. A device driver specifically used for the input devices 2 and 3 is provided for the host PC 26, and the OS executes predetermined processing based on the relative coordinate data sent to the device driver, thereby shifting the pointer 7 displayed on the display unit 5 (see FIG. 1).

When the first input device 2 is used as an absolute-coordinate input device, both input signals from the first input device 2 and from the second input device 3 are supplied to the host PC 26 as the six-byte format data shown in FIG. 5.

In this case, the format switching controller 17 controls the switch 17a to be off and the switches 17b and 17c to be on via the inverter 18. The format switching controller 12 of the first input device 2 controls the switch 12a to be off and the switch 12b to be on.

Consequently, coordinate information detected by the coordinate detector 2b according to the operation of the sensor 2a of the first input device 2 is converted into absolute coordinate data by the absolute coordinate converter 11b. The absolute coordinate data is then sent to the interface 24 of the second input device 3 via the interface 14, and is supplied to and is stored in the six-byte buffer 21*b* via the line L3. Subsequently, the absolute coordinate data is converted into the six-byte-format absolute coordinate data illustrated in FIG. 5 by the format converter 22*b*.

The amount of distortion detected by the distortion detector 3*b* of the second input device 3 according to the operation of the distortion sensor 3*a* is temporarily converted into relative displacement data by the relative displacement converter 3*c*. After the relative displacement data is stored in the three-byte buffer 21*a*, it is converted into the six-byte-format relative coordinate data shown in FIG. 5 by the format converter 22*a*. The format converter 22*a* further adds an ID flag, as ID information for identifying the relative coordinate data, to part of the six-byte format data.

The device selector 23 selects between the absolute coordinate data based on the input operation of the first input device 2 supplied from the format converter 22*b* and the relative coordinate data based on the input from the second input device 3 converted by the format converter 22*a* and added with the ID information. This selecting operation is performed by switching the device selector 23 to either the P3 or the P4 side in response to a command from the host PC 26 according to whether the sensor 2*a* or the distortion sensor 3*a* is used.

Alternatively, if both the first input device 2 and the second input device 3 are used, the device selector 23 is alternately and rapidly switched to the P3 and P4 sides.

Accordingly, regardless of whether the sensor 2*a* or the distortion sensor 3*a* is used, the same six-byte format data is supplied to the device driver of the host PC 26.

The three-byte-format relative coordinate data converted by the three-byte format converter 16 is shown in FIG. 4. The first-byte field indicates the overflow bit (YO, XO), the sign bit (YS, XS), button information, etc. The second- and third-byte fields represent X-coordinate and Y-coordinate variable information formed of the X count and the Y count, respectively.

The six-byte-format coordinate data converted by the format converter 22*a* or 22*b* is shown in FIG. 5. The first-byte field designates ID information for distinguishing the corresponding input device from an external input device (for example, a mouse), and the second-, third-, fourth-, fifth-, and sixth-byte fields indicate the X count, the X count and button information, the Y count and button information, the Y count, and the Z count, respectively.

Concerning the absolute coordinate data converted by the format converter 22*b*, the Z count in a data field 30 becomes variable. In contrast, regarding the relative coordinate data converted by the format converter 22*a*, the Z count in the data field 30 becomes fixed (ID flag).

When the personal computer system 1 is operating to form the six-byte format, both the relative coordinate data obtained by the operation of the distortion sensor 3*a* and the absolute coordinate data obtained by the operation of the sensor 2*a* are supplied to the device driver of the host PC 26 in the same six-byte signal format. It is thus easy to process both types of data in the device driver. The relative coordinate data can be distinguished from the absolute coordinate data by checking whether the Z-count data field 30 represents an ID flag.

The operation of the device driver provided for the host PC 26 is discussed below with reference to the flow chart of FIG. 3.

In step ST1, data supplied from the interface 25 and data supplied from a third input device are decoded in the device driver. The third input device may be a mouse controller externally connected to the notebook personal computer shown in FIG. 1. The structure of the third input device is, for example, as follows. A sphere is disposed at the lower (or upper) portion of a housing, and two X- and Y-axis bars in contact with the sphere are provided. The housing is moved in a desired direction to rotate the sphere, and the corresponding rotational force is detected by a detector formed of an encoder or the like. The mouse controller is used for inputting relative coordinates.

Referring again to FIG. 3, it is determined in step ST2 whether the decoded data is six-byte-format data. If the outcome of step ST2 is no, the data is processed as three-byte-format data in step ST8. This processing is executed when the circuit shown in FIG. 2 is operating to generate three-byte-format data, or when the third input device, such as a mouse, is operating. According to the processing executed in step ST8, the data is processed as displacement data (tracking data) for shifting a cursor (pointer) on the screen.

If it is found in step ST2 that the data is six-byte-format data, it is further determined in step ST3 whether the Z-count field indicates fixed data (ID flag). If the ID flag is detected in step ST3, it is determined that the data is relative coordinate data supplied from the second input device 3, and is processed as six-byte-format data in step ST7. If the ID flag is not detected in step ST3, it is determined that the data is absolute coordinate data supplied from the first input device 2, and is processed as six-byte-format data in step ST4. This data is obtained by writing a signature, characters, or graphics by using a pad. In step ST5, the data processed in the individual steps ST4, ST7, and ST8 are processed in the same manner by using the single device driver. In step ST6, the processed data is sent to a system, such as an OS, in which further processing is performed on the data to be displayed on the screen.

Figure 3:
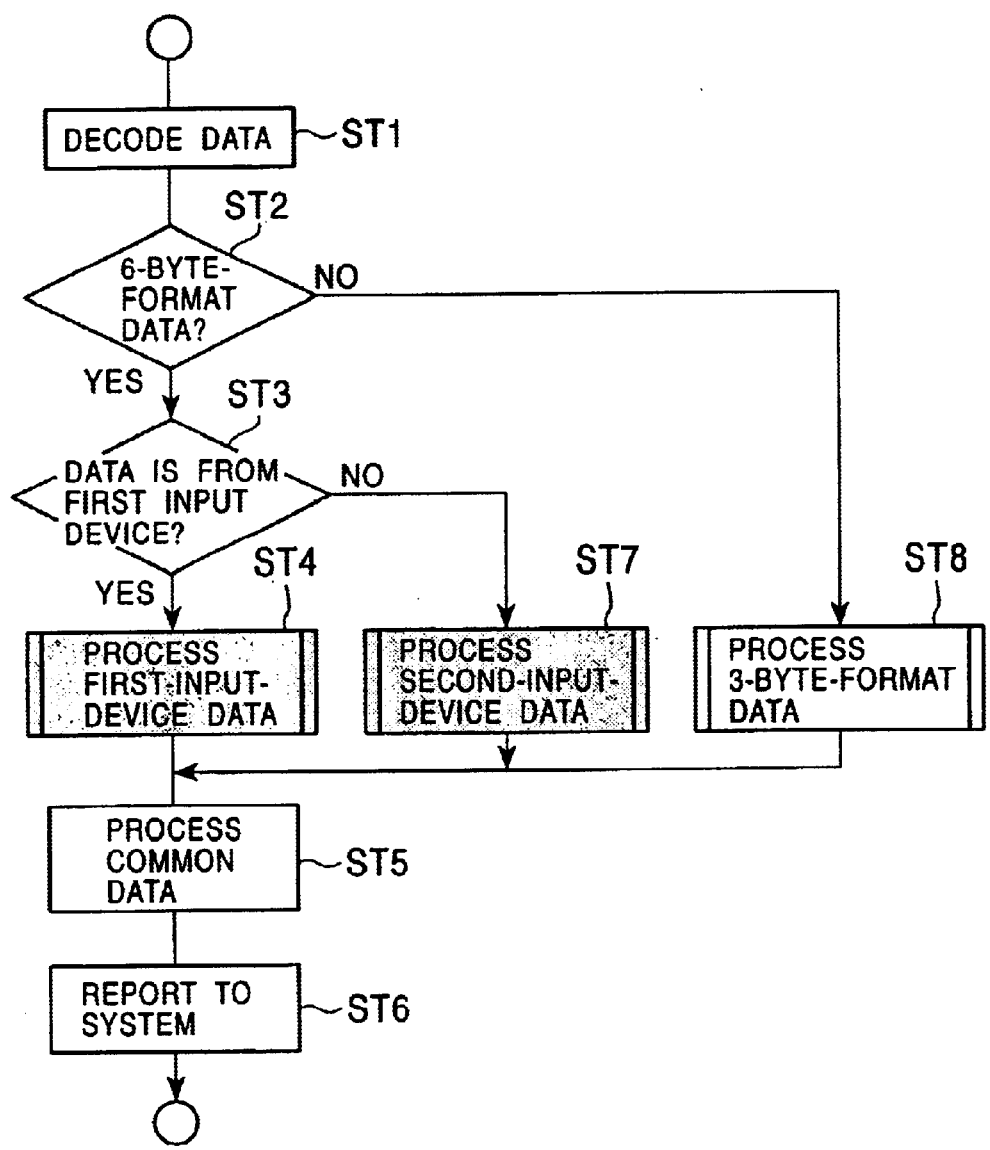
FIG. 3 is a flow chart illustrating the operation performed by a device driver when the personal computer system shown in FIG. 1 is used.

As stated above, the coordinate data supplied from the circuit shown in FIG. 2 is processed by the device driver according to the flow chart of FIG. 3. Thus, absolute coordinates, such as for characters, can be input by using the pad-type first input device 2, while relative coordinates for vertically scrolling or tracking the display screen (window) of, for example, a word processor or a spreadsheet, can be input by using the stick-type second input device 3. Further, relative coordinates for tracking a cursor (pointer) can be input by using the mouse-type third input device.

In particular, since the absolute coordinate data from the pad-type sensor 2*a* and the relative coordinate data from the stick-type sensor 3*a* are processed in the single device driver in the same data format, the following type of processing can be easily executed. For example, a user starts to input characters or graphics by using the pad-type sensor 2*a* and stops halfway through. Then, by using the stick-type distortion sensor 3*a*, the user moves the cursor to the position at which the user stopped writing, and inputs the position. Accordingly, the user is able to continue writing the characters or graphics by using the pad-type sensor 2*a* without losing track of the input position.

The personal computer system of the present invention is not limited to the foregoing embodiment. For inputting relative coordinate data, another type of input device, such as a trackball, may be used. Although ID information is added to part of the relative coordinate data format, it may be added to the absolute coordinate data format, which may be suitably modified according to the format type.

As is seen from the foregoing description, the present invention offers the following advantages. Different types of input devices can be used simultaneously without the need for a switching operation. This advantage is effective particularly when absolute coordinate data, such as characters, is input by a finger or by a pen using a pad-type input device. In this case, even if the user lifts the finger or the pen from the pad and loses track of the input position, relative coordinate data can be input by using a different type of input device without having to perform a switching operation for the input devices. As a result, characters can be input correctly.

What is claimed is:

1. A dual pointing device used to control an on-screen cursor in a host comprising:

a port;

a format converter coupled to said port, said format converter configured to transmit a data stream in fixed lengths of three or six bytes;

a touch pad comprising a first relative pointing device and an absolute pointing device coupled to said format converter;

a stick comprising a second relative pointing device coupled to said format converter;

said absolute pointing device comprising a sensor that translates an absolute position on a surface of said touch pad to a specific location on a screen of said host; and said first relative pointing device and said second relative pointing device each comprising a cursor control device in which a movement of a cursor on said screen correlates to a movement of a user's finger on said cursor control device, respectively;

wherein said format converter is configured to embed identifying data in said data stream that distinguishes said stick from said touch pad, and said port comprise a single channel through which data received from said format converter is transmitted to said host coupled to said screen.

2. The dual pointing device of claim 1, wherein said touch pad transmits data in a fixed length of three or six bytes and said stick transmits data in a fixed length of three bytes.

* * * * *